(12) United States Patent
Mau (10) Patent No.: US 7,540,575 B2
(45) Date of Patent: Jun. 2, 2009

(54) COMPUTER CASE RETENTION STRUCTURE

(75) Inventor: Shu-Hua Mau, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 401 days.

(21) Appl. No.: 11/515,771

(22) Filed: Sep. 6, 2006

(65) Prior Publication Data

US 2007/0075613 A1  Apr. 5, 2007

(30) Foreign Application Priority Data

Oct. 5, 2005  (TW)  .............................. 94134834 A (51) Int. Cl.
*H05K 7/00* (2006.01)
(52) U.S. Cl. .................. 312/223.2; 312/265.5; 361/683
(58) Field of Classification Search ............. 312/223.1, 312/223.2, 265.5, 265.6, 222, 215, 263, 257.1; 292/80, 81, 84, 87–89, 300, 303, DIG. 11, 292/DIG. 63; 361/724–727, 683, 679; 220/323, 220/324, 780, 782, 786
See application file for complete search history.

(56) References Cited

U.S. PATENT DOCUMENTS

| 4,521,050 | A | * | 6/1985 | Rea et al. ..................... 296/192 |
| 4,909,579 | A | * | 3/1990 | Liu .......................... 312/223.2 |
| 5,197,789 | A | * | 3/1993 | Lin .......................... 312/223.2 |
| 5,743,606 | A | | 4/1998 | Scholder |
| 5,918,956 | A | | 7/1999 | Scholder |
| 5,971,506 | A | * | 10/1999 | Dubin ...................... 312/223.2 |
| 5,995,363 | A | | 11/1999 | Wu et al. |
| 6,074,028 | A | | 6/2000 | Ho et al. |
| 6,362,975 | B1 | * | 3/2002 | Liu et al. ..................... 361/796 |
| 6,367,896 | B1 | | 4/2002 | Peng et al. |
| 6,935,661 | B1 | * | 8/2005 | Farnsworth et al. ......... 292/162 |
| 7,012,804 | B2 | * | 3/2006 | Yokote et al. ............... 361/685 |
| 7,277,277 | B2 | * | 10/2007 | Bang ........................ 361/683 |
| 7,388,758 | B2 | * | 6/2008 | Chen et al. ................... 361/801 |
| 2006/0092603 | A1 | * | 5/2006 | Chen et al. .................. 361/683 |

* cited by examiner

*Primary Examiner*—Janet M Wilkens
(74) *Attorney, Agent, or Firm*—Rabin & Berdo, P.C.

(57) ABSTRACT

A computer case retention structure includes a cover and a base. The base has a bottom plate and a guided way with a protruding hook. The cover has at least one side plate, a first and second elastic blades are disposed on the side plate. A protrusion is extended downward from a tip of the second elastic blade to slide against the guided way. For fixing the cover onto the base, the protrusion slides over the protruding hook and then stopped by the protruding hook, so that the cover is fixed onto the base without being moved relative to the base. For removing the cover, a release element disposed on the first elastic blade is pressed to bend the first and second elastic blades, separating the protrusion from the guided way. Then the cover can be removed from the base without the protrusion being stopped.

11 Claims, 14 Drawing Sheets

COMPUTER CASE RETENTION STRUCTURE

CROSS-REFERENCE TO RELATED APPLICATIONS

This non-provisional application claims priority under 35 U.S.C. § 119(a) on Patent Application No(s). 094131834 filed in Taiwan, R.O.C. on Oct. 5, 2005, the entire contents of which are hereby incorporated by reference.

BACKGROUND OF THE INVENTION

1. Field of Invention

The present invention relates to a computer case, and more particularly, to a computer case retention structure for fixing a cover to a base.

2. Related Art

The case of the conventional horizontal-type computer is formed by a cover and a base. The cover has a top plate and two side plates, wherein the two side plates are perpendicular to bottom plate and extended from two opposing edges thereof. The base has a bottom plate, a front plate, and a back plate. When the cover is placed on the base, the two side plates, the front plate, and the back plate form a containing space between the top and bottom plates. Electronic devices of the computer, for example, motherboard, central processing unit, hard disc drive, and optical disc drive, are placed on the base, thus the electronic devices are protected after the cover is fixed onto the base.

As for the conventional approach of fixing the cover to the base, several screw holes are formed on the back plate, and a lug or extension wing with a through hole is extended from the edge of the side plate. After the cover has been placed on the base, the lug (or extension wing) leans on the back plate, and the through hole of the lug overlaps the screw hole. Then a screw is passed through the through hole to be screwed into the screw hole. Therefore, the cover is fixed onto the base by the screw.

In the approach of fixing the cover onto the base by screws, assembling tools are required for screwing or unscrewing the screws when the cover is going to be fixed onto the base or to be removed from the base, and thus it is inconvenient for maintenance and assembling of the electronic devices. Although some manufacturers enable the screws to be screwed by hands, it is still inconvenient that many screws are required to be screwed or unscrewed when the cover is going to be fixed onto the base or to be removed from the base. Therefore, there are improved computer case retention structures that are able to be operated by hands, wherein the cover can be released by pressing the computer case retention structures, such as those disclosed in the U.S. patents of U.S. Pat. Nos. 5,743,606, 5,918,956, 5,995,363, 6,074,028, and 6,367,896. In each of those mentioned above, the cover is fixed onto the base by engaging an elastic hook with a slot.

Figure 1A:
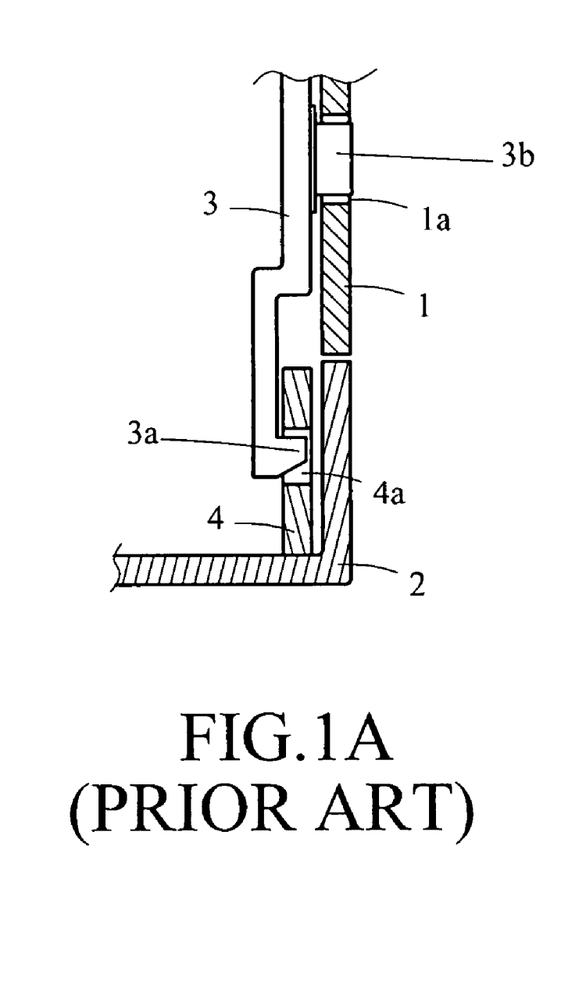
FIGS. 1A and 1B are the partial cross-sectional views of the cover and the base of a computer case in the prior art, wherein the engagement of the elastic hook and the slot is shown.
Figure 1B:
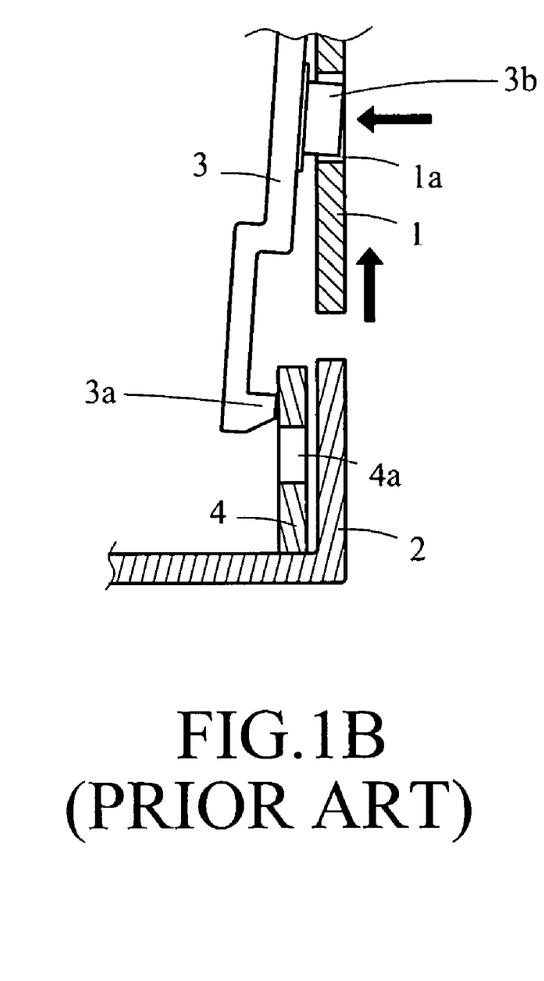
Figure 2:
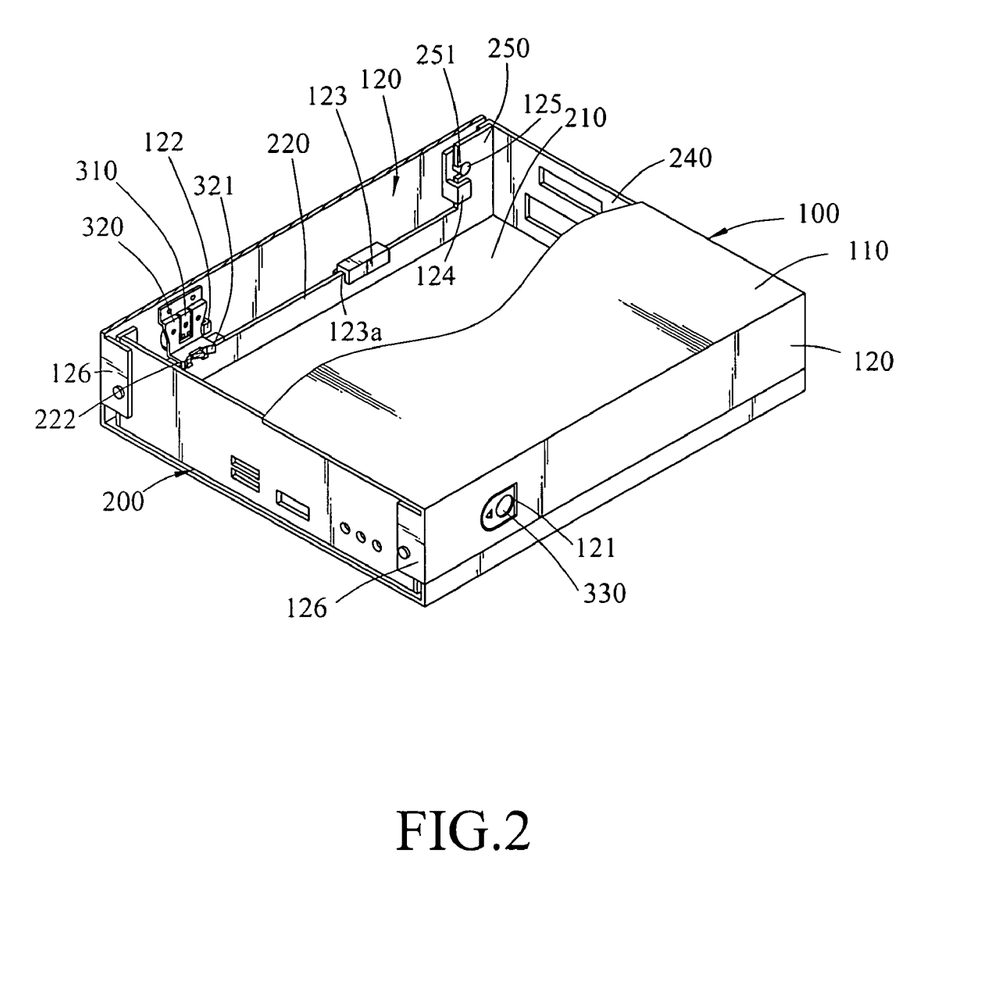
FIGS. 2 and 3 are the perspective views of a preferred embodiment of the present invention at different viewing angles, wherein the fixing of the cover onto the base, and the removing of the cover from the base are shown.
Figure 3:
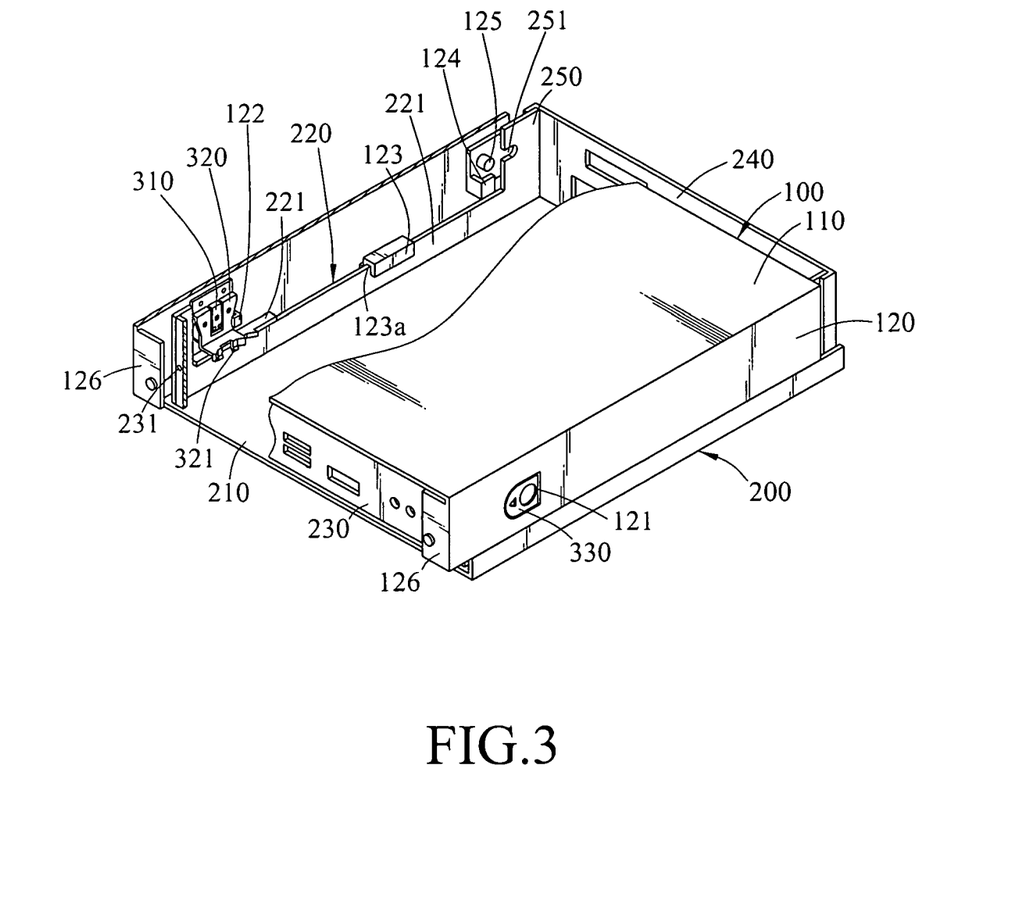
Figure 4:
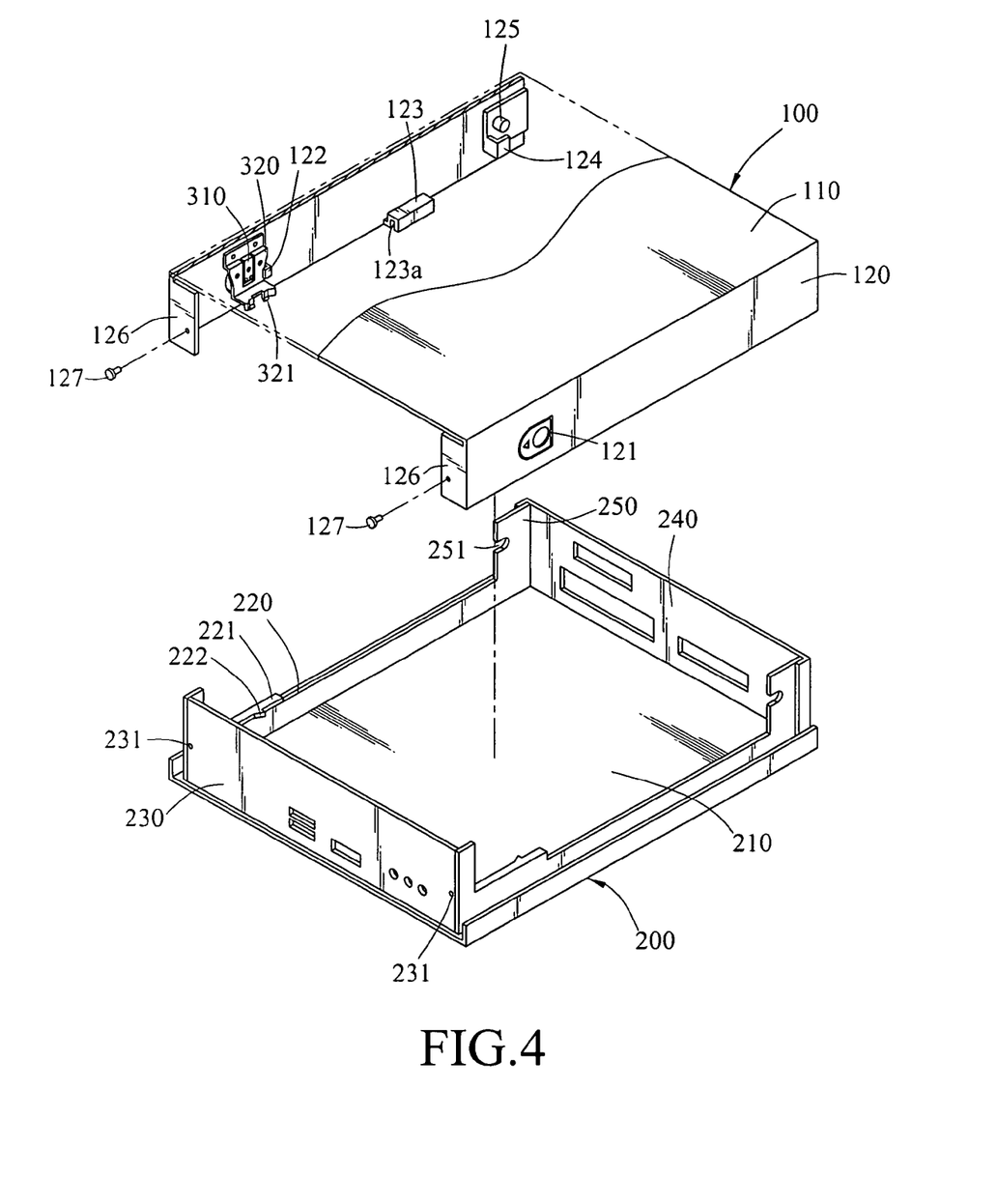
FIGS. 4 and 5 are the exploded perspective views of the preferred embodiment of the present invention at different viewing angles.
Figure 5:
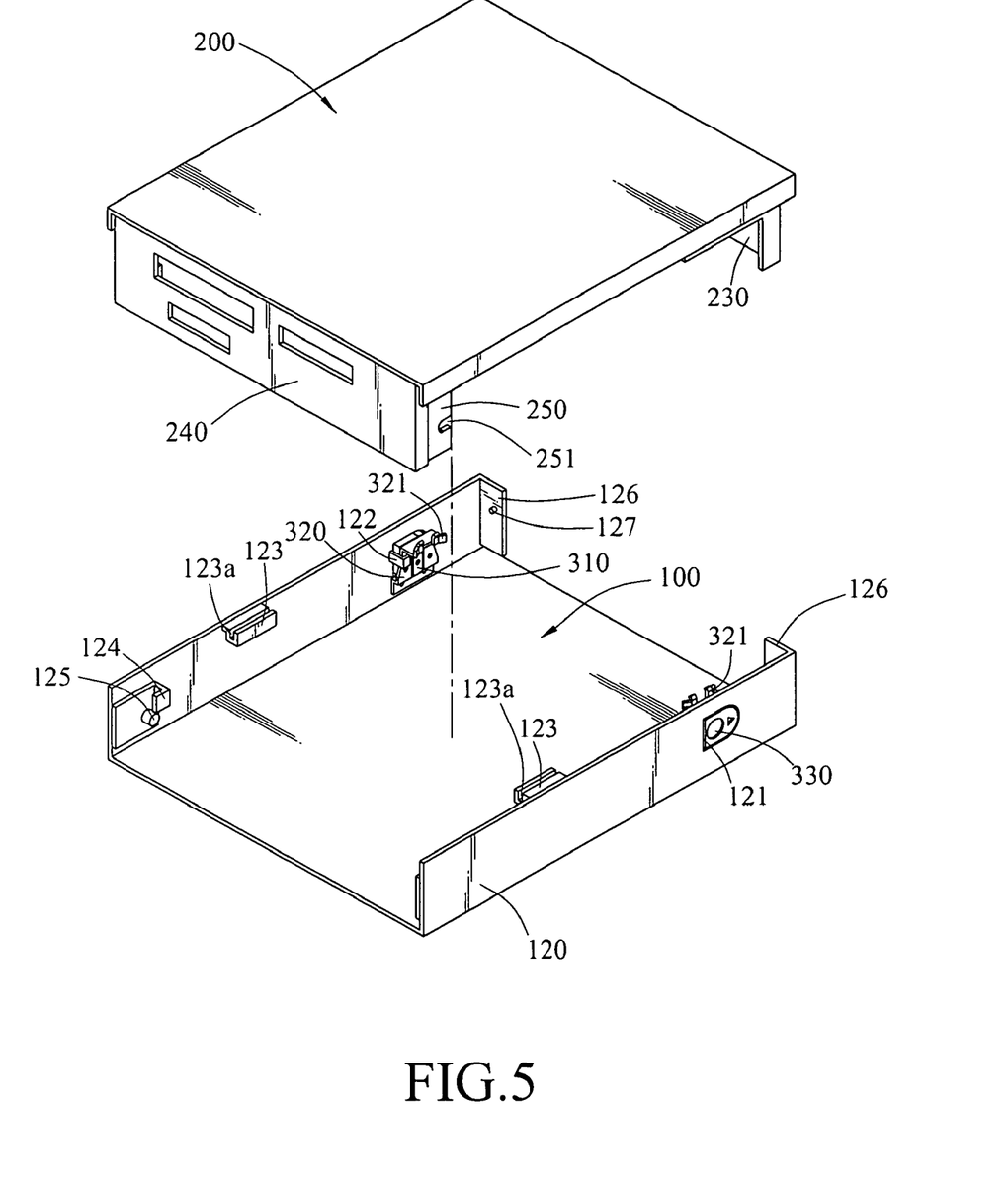
Figure 6:
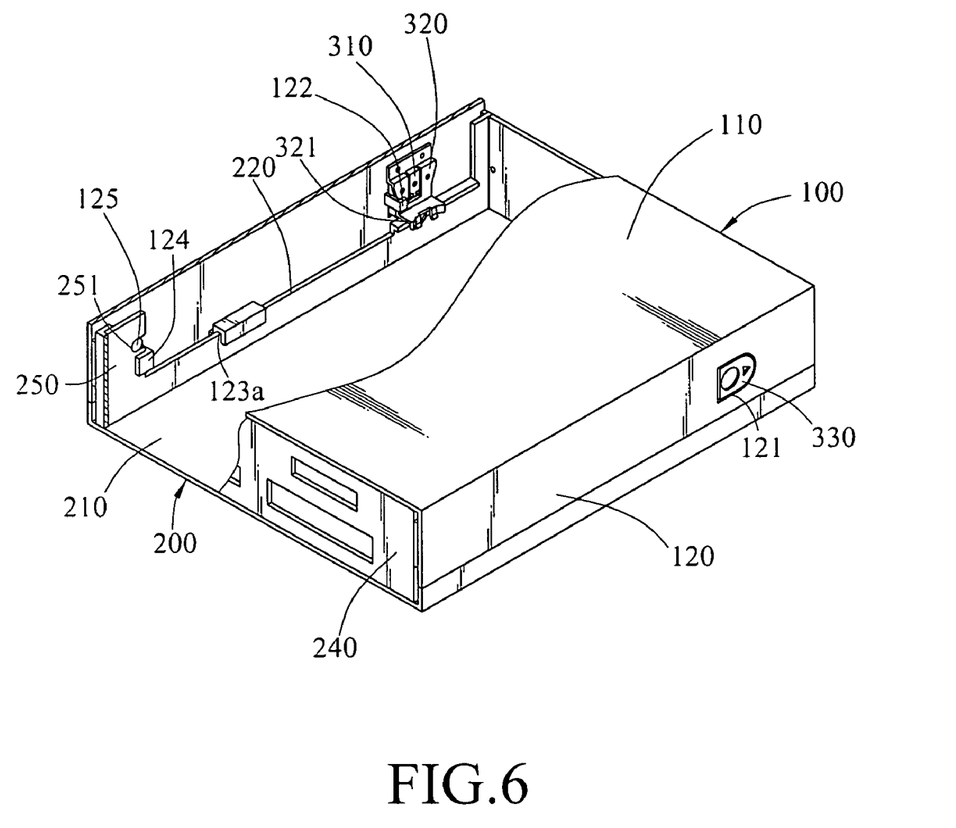
FIG. 6 is the schematic view of the application of the preferred embodiment of the present invention.

Referring to FIGS. 1A and 1B, it is a partial cross-sectional view of a cover 1 and a base 2 in the prior art, wherein an elastic hook 3 with latching portion 3a formed at the tip thereof is disposed on the inner side of the cover 1. The cover 1 has an opening 1a, and a lump 3b fixed on the elastic hook 3 is located in the opening 1a. A fixing element 4 with a slot 4a is disposed on the inner side of the base 2. When the cover 1 is placed on the base 2, the latching portion 3a is engaged with the slot 4a to fix the cover 1 onto the base 2, and thus the cover 1 cannot be moved relative to the base 2, as shown in FIG. 1A. When removing the cover 1 from the base 2, a force is applied through the opening 1a from the outside of the cover 1 to push the lump 3b inward, so as to push the elastic hook 3 for releasing the latching portion 3a from the slot 4a. Then the elastic hook 3 is disengaged from the fixing element 4, as shown in FIG. 1B. And therefore the cover 1 can be removed from the base 2. However, permanent deformation of the elastic hook 3 occurs with frequently repeated pressing or over-pressing acted. Thus the elastic hook 3 cannot be completely engaged with the slot 4a, and the fixing of the cover 1 is negatively affected. Since the lump 3b is located in the opening 1a formed on the cover 1, the exposed part of the lump 3b through the opening 1a is depressed inward if the permanent deformation of the elastic hook 3 occurs. And the overall appearance of the computer case and the fixing of the cover are both negatively affected. Therefore, it has become an essential issue to prolong the lifetime of the elastic hook, preventing the fatigue of material or permanent deformation occurring.

SUMMARY OF THE INVENTION

In the prior art, the approach of fixing the cover to the base provides an elastic hook disposed on the cover for being engaged with a fixing element disposed on the base, the fatigue of material and permanent deformation of the elastic hook may occur with frequently repeated pressing or over-pressing acted on the elastic hook, thus the fixing of the cover is negatively affected. In view of the above problems, the object of the present invention is to provide a computer case retention structure for reducing the frequency of the elastic retention elements being bent, and preventing over-pressing from being acted on the elastic retention elements. Thereby, the lifetime of the elastic retention elements is prolonged, and thus the desirable retention effect also can be remained after repeated pressing acted on the elastic retention elements for a long time.

In order to achieve the above object, a computer case retention structure is provided, which includes a cover, a base, a first elastic blade, a second elastic blade, and a release element, wherein the base has a bottom plate and at least one guided way disposed at an edge of the bottom plate, and a protruding hook is formed on the guided way. The hook has a slid edge inclined with respect to the guided way, and a stopped edge vertical to the guided way. The cover has a top plate and at least one side plate, wherein the side plate corresponds to one edge of the bottom plate. One end of the first and second elastic blades is fixed to the inner surface of the side plate to be suspended. At least one protrusion is extended downward from a tip of the other end of the second elastic blade. When the cover is placed on the base and pushed to cover to the base, the protrusion slides against the guided way and then slides along the slid edge of the protruding hook to slide over the protruding hook. Then protrusion is stopped by the stopped edge of the protruding hook to prevent the protrusion from moving towards the inverse direction, so that the cover is fixed onto the base without being moved relative to the base towards the inverse direction. The release element is disposed on the first elastic blade, it is provided for being pressed to bend the first and second elastic blades at the same time. For removing the cover from the base, the release element is pressed to bend the first and second elastic blades, moving the protrusion of the second elastic blade away from the guided way. Then the cover can be moved relative to the base towards the inverse direction and then be removed from the base since the protrusion is not stopped by the protruding hook.

The benefit of the present invention is in that the first elastic blade is prevented from being frequent bent when the cover is fixed onto the base, due to the cooperation of the first and second elastic blades. According to the frequency and degree of being bent of the first elastic blade is reduced, the time for the fatigue of material and permanent deformation of the first elastic blade occurring is delayed. And the lifetime of the first elastic blade is effectively prolonged. Also, the appearance of the cover is maintained.

Hereinafter the specific features and advantages of the invention will be described in the detailed description. The description will make those skilled in the art understand and implement the technology of the invention. The purposes and advantages will become apparent to those skilled in the art upon reading the specification, claim and drawings.

The above description and the detailed description below are provided to demonstrate and explain the principle of the invention, and to further illustrate claim of the invention.

DETAILED DESCRIPTION OF THE INVENTION

To further understand the objects, structures, features, and functions of the present invention, it is illustrated in great detail below with reference to the embodiments.

Referring to FIGS. 2, 3, 4, 5, and 6, a computer case retention structure according to the preferred embodiment of the present invention is shown, which includes a cover 100 and a base 200.

The cover 100 has a top plate 110 and two opposite side plates 120, the side plates 120 are perpendicularly extended from opposite edges of the top plate 110 respectively. An opening 121 is formed on each of the side plate 120 of the cover 100. A first elastic blade 310 and a second elastic blade 320 are disposed on the inner surface of each side plate 120, wherein one end of the first and second elastic blades 310 and 320 is fixed to the inner surface of the side plate 120, and the other end is suspended from the inner surface of the side plate 120 and exposed on the opening 121, swinging freely. In this embodiment, the second elastic blade 320 has a hollow area, and the profile of the second elastic blade 320 is shaped to be V-shaped or U-shaped while the hollow area is rectangular. The first elastic blade 310 is just located within the hollow area of the second elastic blade 320. The first elastic blade 310 and the second elastic blade 320 can be formed independently and separated from each other, and one end of them are fixed onto the inner surface of the side plate 120, and the other end of the first and the second elastic blades 310, 320 are swinging freely. The first elastic blade 310 also can be formed with and the second elastic blade 320 monolithically, and one end of them are connected to each other and fixed onto the inner surface of the side plate 120, and the other end of the first and the second elastic blades 310, 320 are separated from each other, swinging freely.

Figure 7:
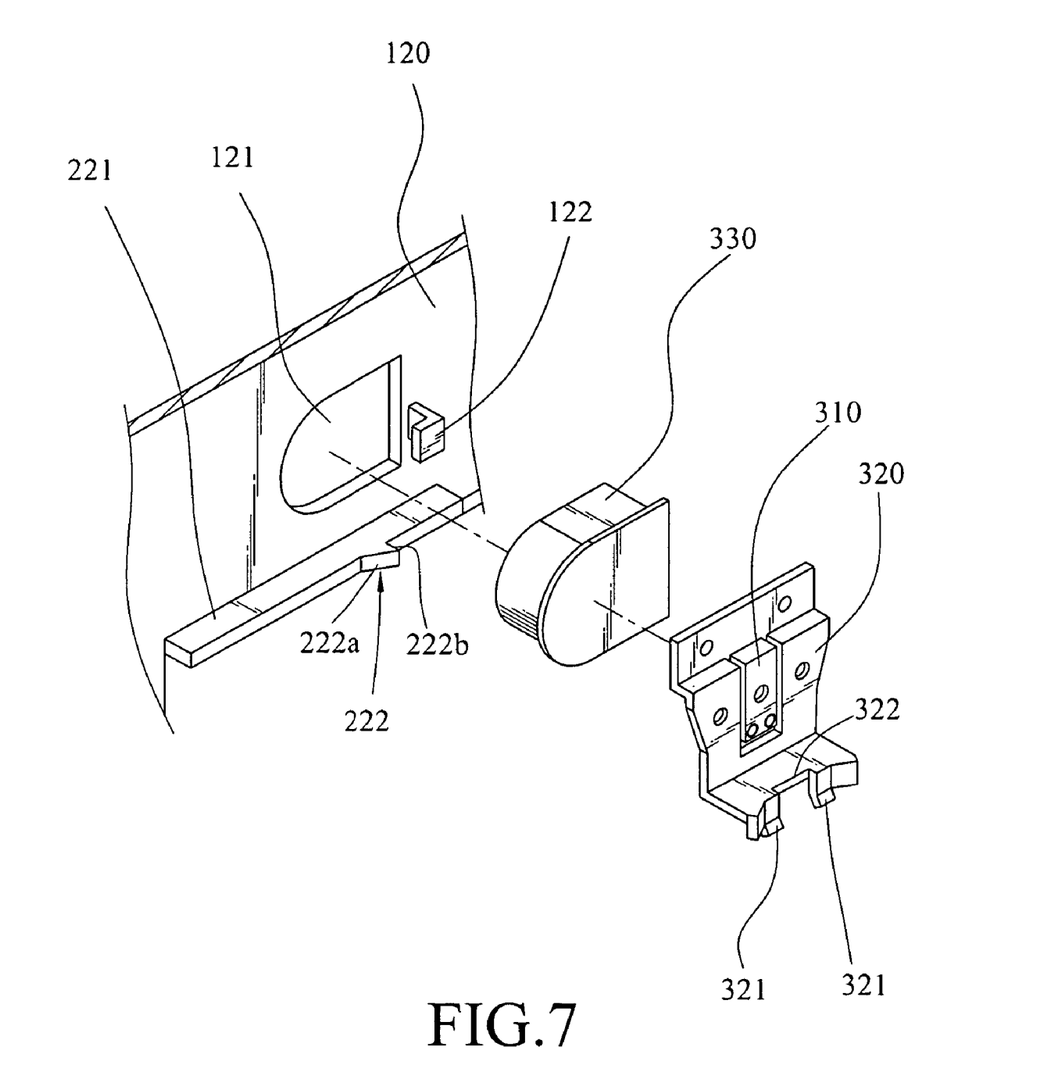
FIGS. 7 and 8 are the enlarged views of the partial elements according to the preferred embodiment of the present invention.

Referring to FIG. 7, a release element 330 is disposed on the first elastic blade 310, and located within the opening 121. The release element 330 can be a lump, a button, or a block, wherein the width of the release element 330 is larger than the width of the first elastic blade 310, and the second elastic blade 320 is also partially or entirely covered by the release element 330. The release element 330 is provided for being pressed through the opening 121 from outside of the side plate 120 to move the release element 330 inwards, such that the release element 330 pushes and bend the first elastic blade 310 towards the inner side of the cover 100, and then the release element 330 presses against the second elastic blade 320 and bend the second elastic blade 320 inwards. In addition, two protrusions 321 are downward extended from the tip of the other end of the second elastic blade 320, protruding from one side surface of the second elastic blade 320. A restriction hook 122 is disposed on the inner surface of the side plate 120, corresponding to one edge of the second elastic blade 320. When the release element 330 is pressed to bend the first elastic blade 310 and second elastic blade 320, the restriction hook 122 restricts the bending angle of the second elastic blade 320 and the traveling distance of the release element 330. The restriction hook 122 is provided for preventing over-pressing from being acted on first elastic blade 310 and second elastic blade 320, and thus permanent deformation of the first elastic blade occurring is delayed. In addition, a plurality of guide plates 123 is disposed on the inner surface of each side plate 120, wherein each of the guide plates 123 is shaped to be V-shaped or U-shaped in cross-section along its longitudinal axis, with a horizontally extended guided groove 123a formed at the recessed part of the guide plates 123. A stopping hook 124 is disposed on the end of the inner surface of the side plate 120 and bending backward far away from the first elastic blade 310 and the second elastic blade 320, which corresponds to the back of the base 200, and a fix pin 125 is disposed near the stopping hook 124.

The base 200 has a bottom plate 210, two guided way 220, a front plate 230, a back plate 240, and two side wings 250. The middle of the top edge of the two side wings 250 are concave downward to form the two guided ways 220 respectively, and the two side wings 250 are respectively disposed at two side edges of the bottom plate 210, while the two guided way 220 are respectively disposed at the two side edges. The front plate 230 is located at one edge of the bottom plate 210 that corresponds to a front side of the computer case, while the back plate 240 is located at another edge of the bottom plate 210 opposite to the front plate 230. The guided way 220 is provided for mating with the guided groove 123a of the guided plate 123, to guide the cover 100 moving linearly relative to the base 200. A retention section 221 is formed by the section of the guided way 220 corresponding to the front side of the base 200, which has a height difference with the other section of the guided way 220. The tip of the second elastic blade 320 and the protrusion 321 slide against the retention section 221. A protruding hook 222, formed on the retention section 221 of the guide way 220, has a slid edge 222a inclined with respect to the guided way 220, and a stopped edge 222b vertical to the guided way 220. When the cover 100 is placed on the base 200 and moved towards the backside of the base 200, the two side plates 120 of the cover 100 correspond to two opposite side edges of the base 200 respectively. Meanwhile, the tip of the protrusion 321 of the second elastic blade 320 slides against the retention section 221 of the guided way 220. When the protrusion 321 reaches the protruding hook 222, the protrusion 321 slides along the slid edge 222a to slide over the protruding hook 222, and elastically bends the second elastic blade 320 at the same time. When the protrusion 321 slides over the protruding hook 222, the stopped edge 222b of the protruding hook 222 acts as a stopper, thus the protrusion 321 is stopped by the stopped edge 222b of the protruding hook 222, to prevent the protrusion 321 from moving towards the inverse direction. Thus the cover 100 is fixed onto the base 200 without being moved relative to the base 200. There are two protrusions 321 shown in FIG. 7, and a slot 322 is formed between the two protrusions 321, and the protruding hook 222 is engaged within the slot 322 for stopping the protrusion 321. However, actually only one protrusion 321 is required to be stopped by the stopped edge 222b of the protruding hook 222. Two protrusions 321 are employed in this embodiment to enable the second elastic blades 320 disposed on the two side plates 120 to exchange with each other. Therefore, only one configuration of the second elastic blade 320 is required to be disposed on the different side plate 120. If the second elastic blade 320 has only one protrusion 321, and the position of the protrusion 321 does not correspond to the central axis of the second elastic blade 320, two configurations of the second elastic blade 320 are required to be disposed on the different side plate 120.

Figure 8:
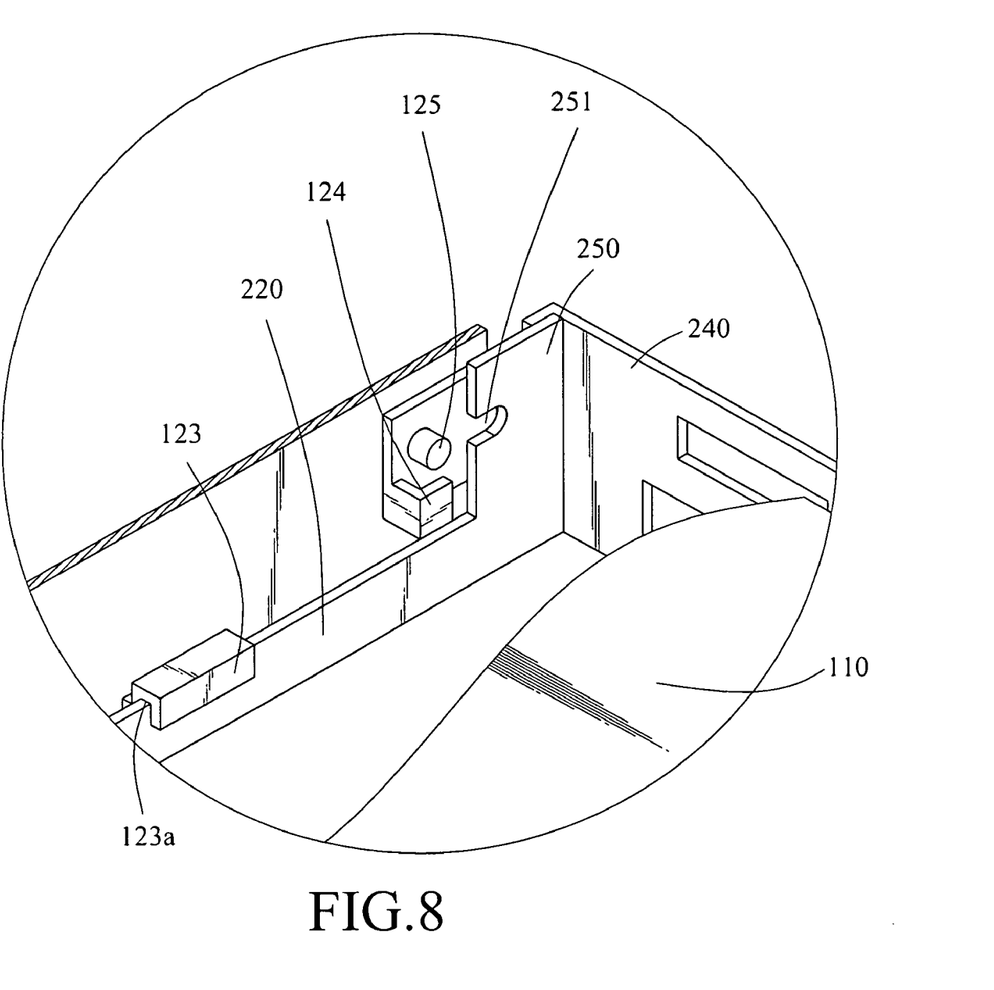

Referring to FIG. 8, and referring to FIGS. 2 to 6, each of side wings 250 adjacent the back plate 240 has a notch 251 facing forwards, which corresponds to the fix pin 125 of the cover 100. When the cover 100 is moved with the guide of the guided way 220 to completely cover the base 200, the fix pin 125 is inserted into the notch 251, and meanwhile the side wing 250 is hooked by the stopping hook 124, preventing the cover 100 from being continuously moved backwards, and preventing the backside of cover 100 from being moved upwards. Also, an extension wing 126 or a lug with a plug 127 extending backwards is formed on the front edge of the cover 100 and vertical to the side plates 120. The plug 127 may be inserted into an aperture 231 formed on the front plate 230, preventing the foreside of the cover 100 from being moved upwards, and thereby preventing the cover 100 being removed from the base 200.

Figure 9A:
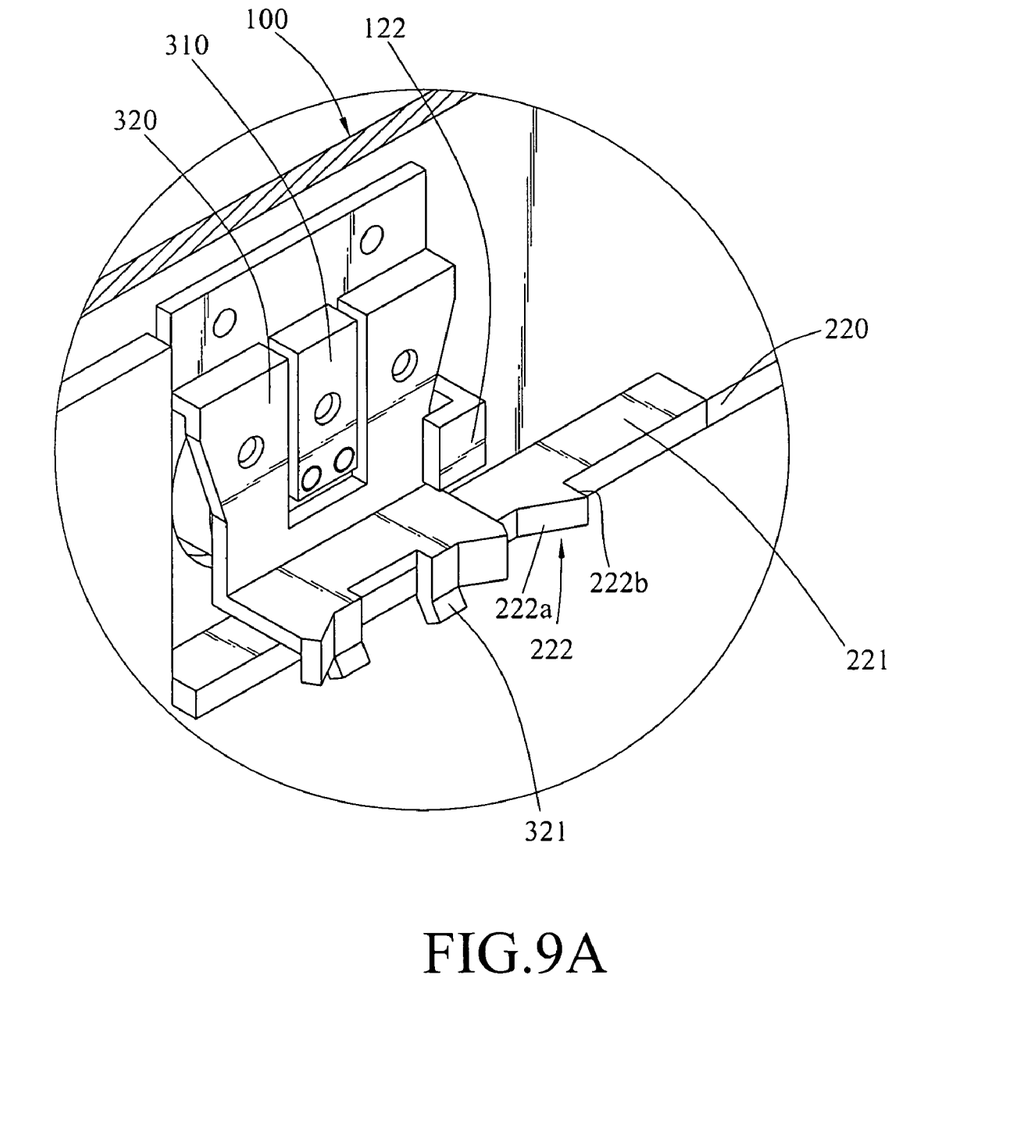
FIGS. 9A, 9B, and 9C are the schematic views showing the operation of the partial elements according to the present invention, wherein the fixing of the cover onto the base is shown.
Figure 9B:
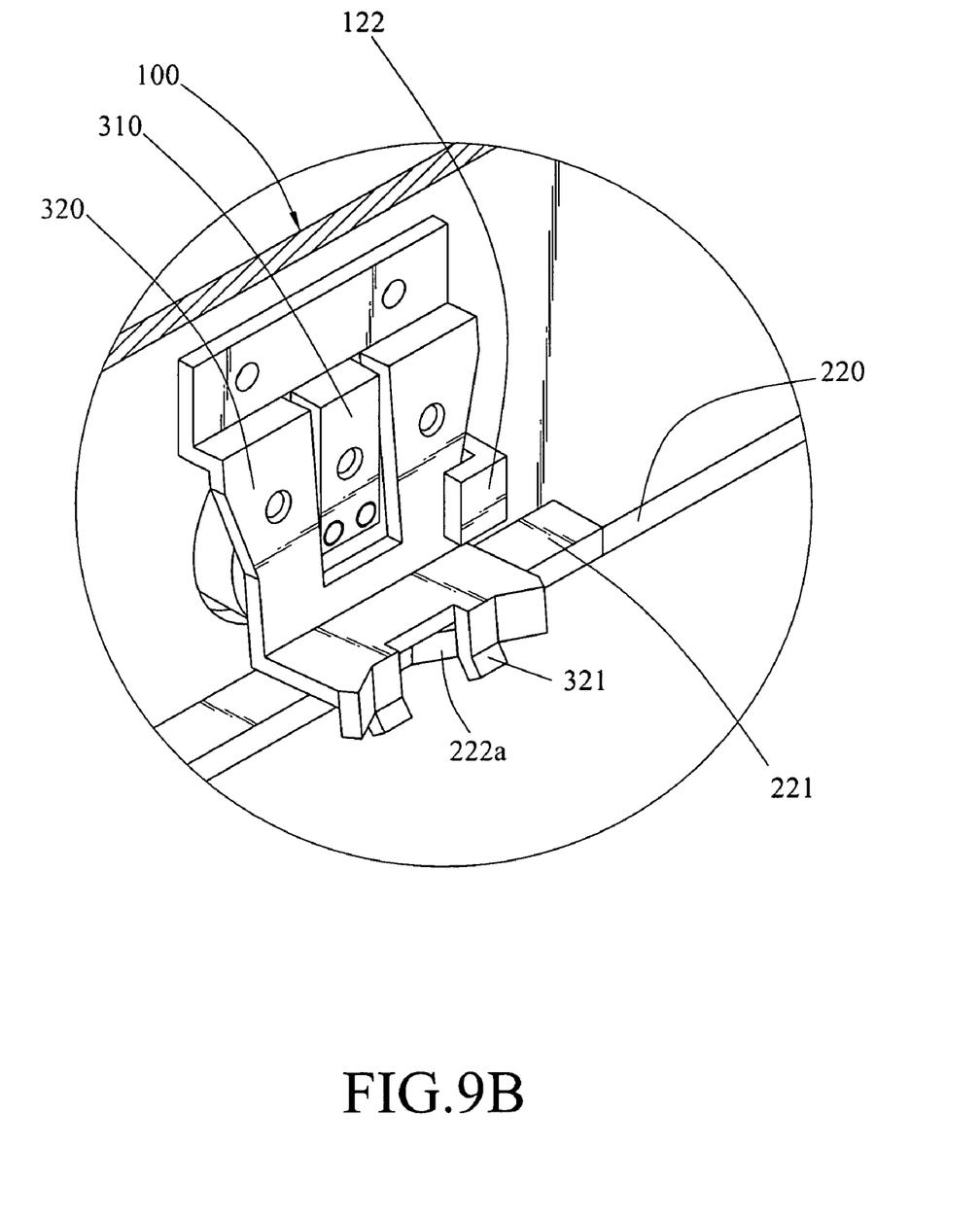
Figure 9C:
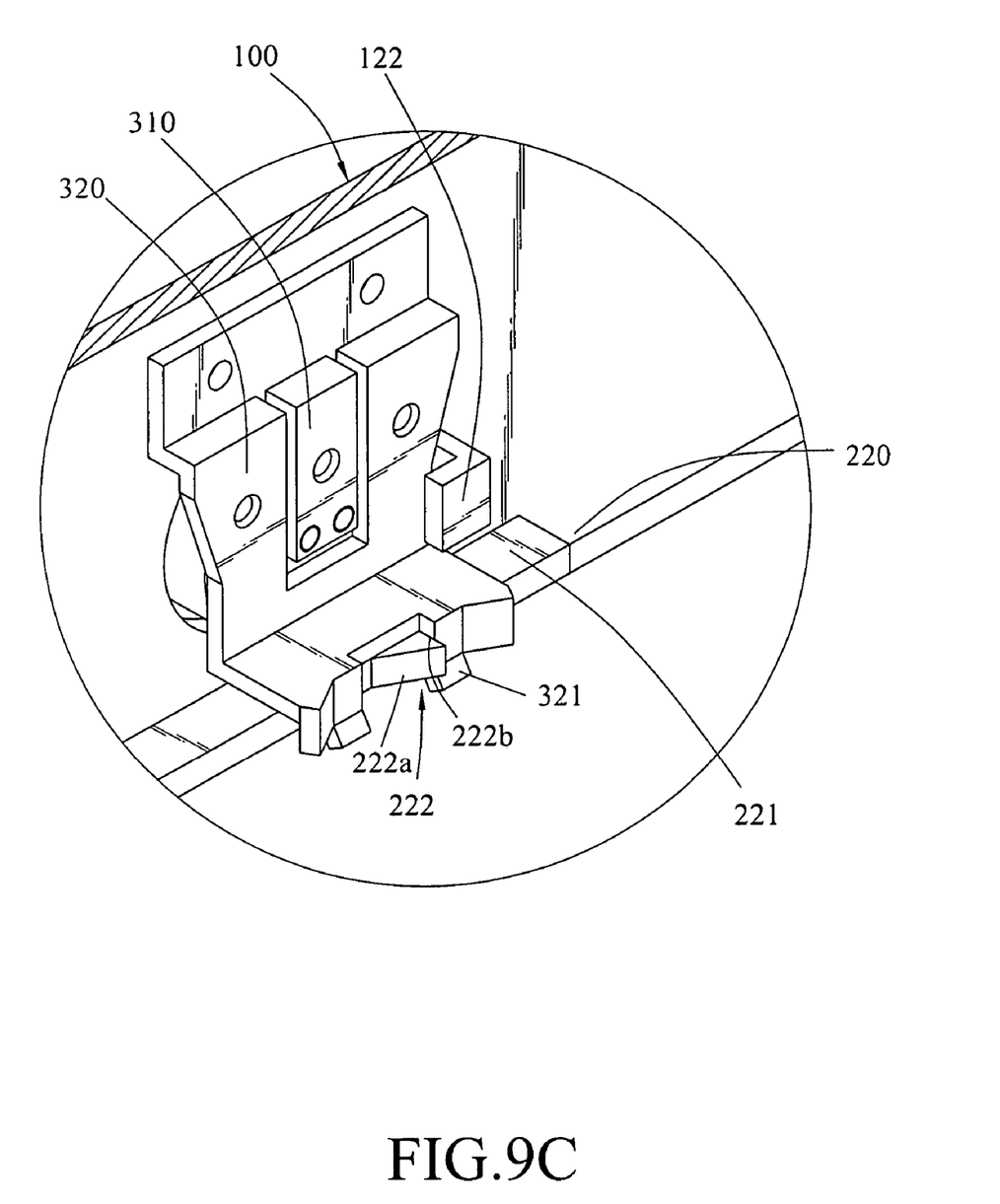

Referring to FIGS. 9A, 9B, and 9C, the operation of the first elastic blade 310 and the second elastic blade 320 when the cover 100 is fixed onto the base 200 is shown. When the cover 100 is placed on the base 200, the foreside of the cover 100 slightly protrudes from foreside of the base 200, and meanwhile, the protrusion 321 of the second elastic blade 320 is pressed against the retention section 221 of the guided way 220. Then, the cover 100 is moved towards the backside of the base 200, and meanwhile, the protrusion 321 slides along the slid edge 222a of the protruding hook 222, so that the second elastic blade 320 is bent towards inwards and deformed, and the protrusion 321 slides over the protruding hook 222 to the stopped edge 222b, so as to place the cover 100 completely on the base 200. At the same time, if the cover 100 is moved towards the inverse direction, the protrusion 321 is stopped by the stopped edge 222b of the protruding hook 222, and the cover 100 is prevented from being moved towards the inverse direction. Therefore the cover 100 is fixed onto the base 200.

Figure 10A:
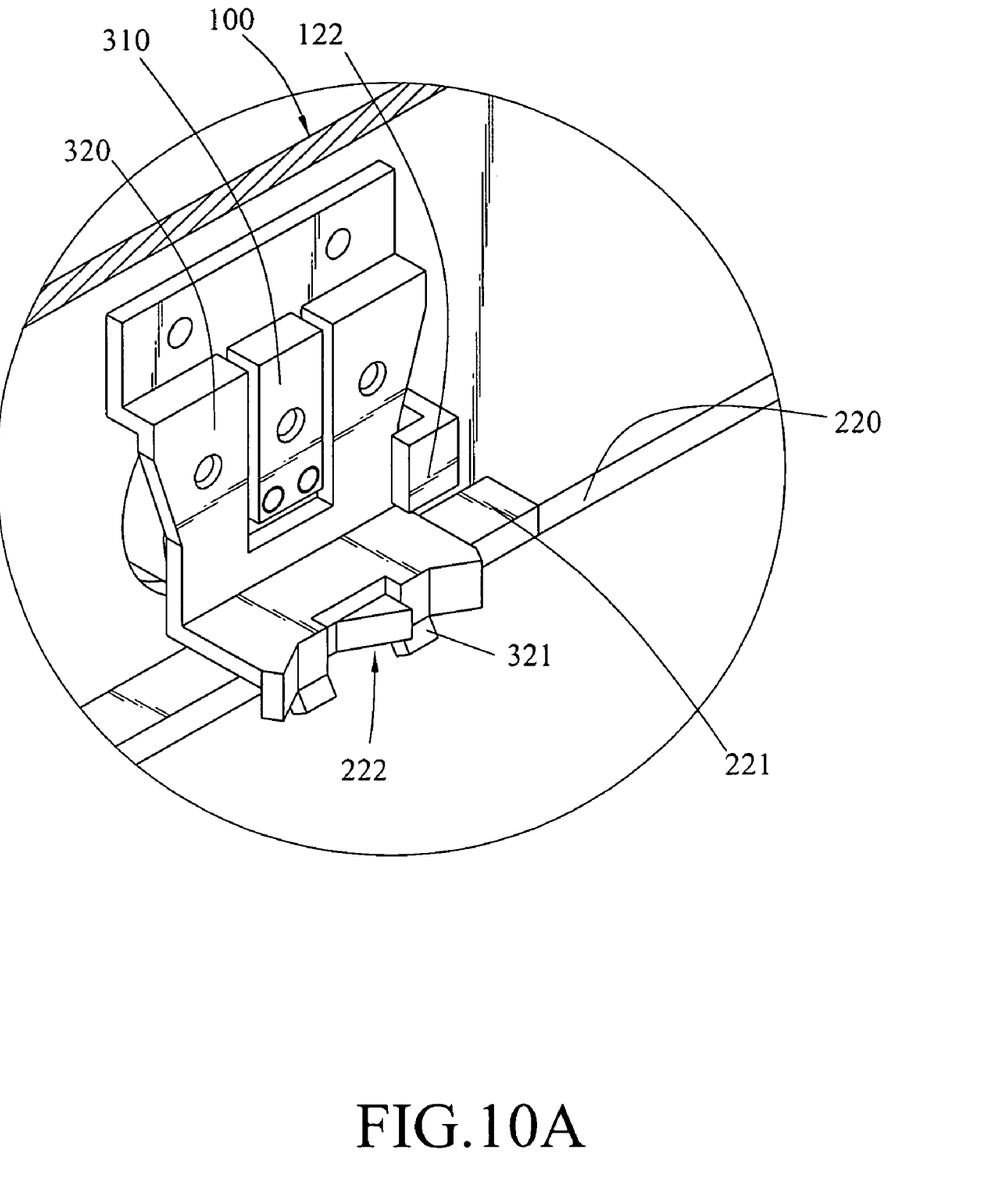
FIGS. 10A, 10B, and 10C are the schematic views showing the operation of the partial elements according to the present invention, wherein the removing of the cover from the base is shown.
Figure 10B:
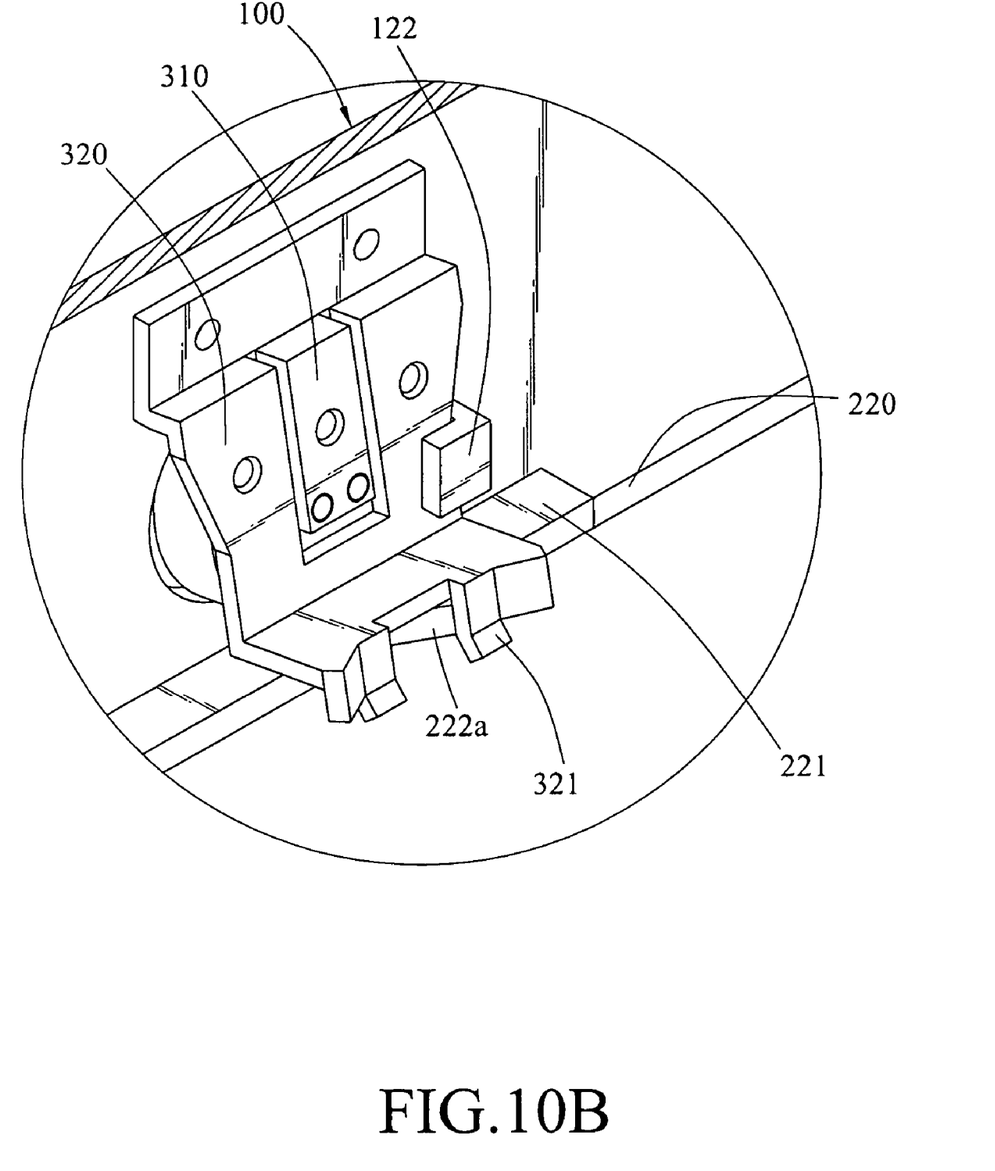
Figure 10C:
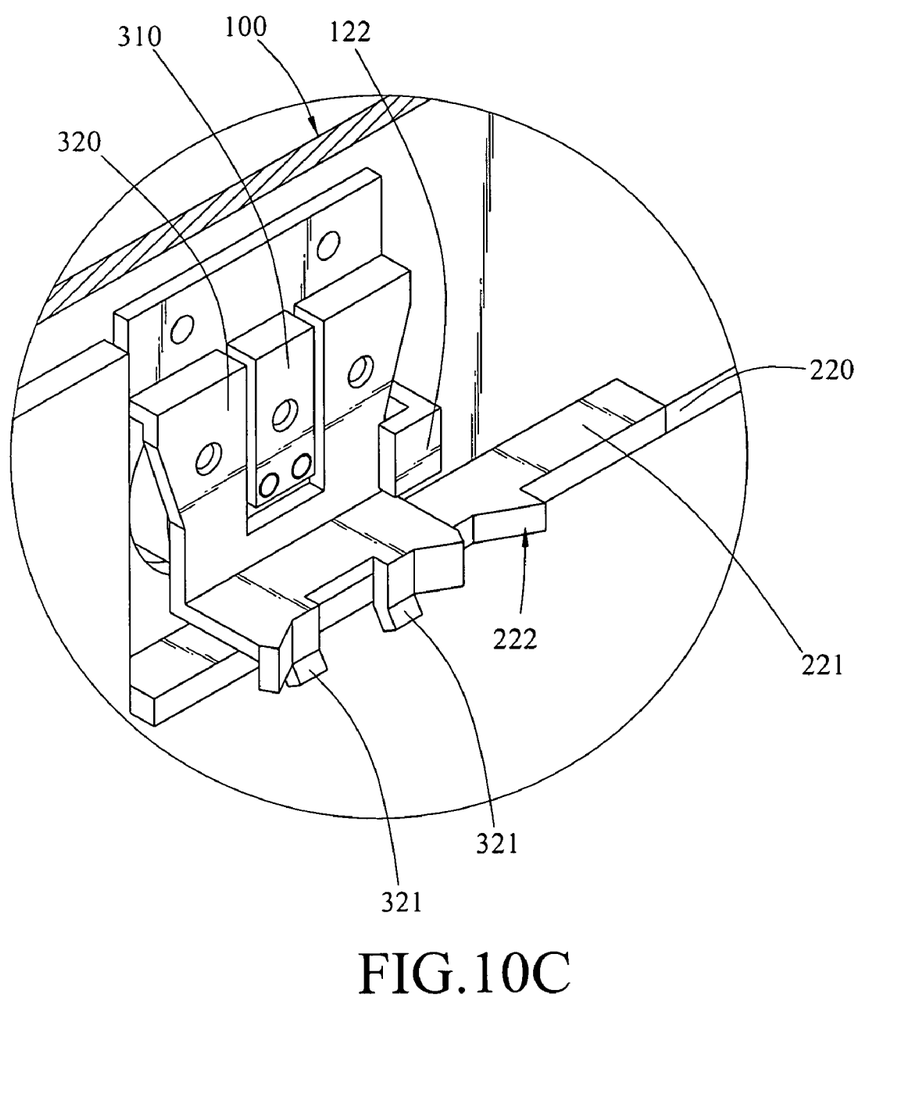

Referring to FIGS. 10A, 10B, and 10C, the operation of the first elastic blade 310 and the second elastic blade 320 when the cover 100 is removed from the base 200 is shown. For removing the cover 100 from the base 200, a force is applied inwardly to the release element 330 through the opening 121 of the cover 100 by a finger, such that the release element 330 is pushed inwardly and forced against the first elastic blade 310 and the second elastic blade 320 at the same time. Accordingly, the first elastic blade 310 and the second elastic blade 320 bend towards the inner side of the cover 100, being deformed. When the second elastic blade 320 is bent towards the inner side of the cover 100, the protrusion 321 is departed from the retention section 221. Therefore, the protrusion 321 of the second elastic blade 320 is not stopped by the stopped edge 222b of the protruding hook 222, and then the second elastic blade 320 is not stopped any more. Thus, the cover 100 can be moved towards the foreside of the base 200 to depart from the base 200. After the release element 330 is released, the first elastic blade 310 and the second elastic blade 320 can return to the original state, and the release element 330 can return to the position when no force is applied.

The maximum distance for the release element 330 to travel towards the inner side of the cover 100 is determined by the extent of bending inward of the first elastic blade 310 and the second elastic blade 320. The restriction hook 122 disposed on the inner surface of the side plate 120 can effectively restricts the bending angle of the second elastic blade 320, i.e., the travel distance of the release element 330 is also limited. Therefore, the bending angle of the first elastic blade 310 and the second elastic blade 320 are restricted within the allowable range of the elastic deformation thereof, without permanent deformation occurring due to over bending.

In addition, when the cover 100 is fixed on the base 200, it shows that only the second elastic blade 320, not the first elastic blade 310, will be bent due to sliding over the protruding hook 222. The first elastic blade 310 will be bent only when the release element 330 is pressed inwardly. Thus, the elastic fatigue effect of the first elastic blade 310 due to the frequent operations may effectively decelerate. When no force is applied to the first elastic blade 310, the release element 330 can be completely maintained within the normal position with no force applied. Therefore, the appearance of the cover 100 is not influenced since the release element 330 is prevented from depressing inwardly.

While the preferred embodiment of the invention have been illustrated and described, it will be clear that the invention is not limited to the embodiment only. Numerous modifications and changes will be apparent to those skilled in the art without departing from the spirit and scope of the invention as described in the claims.

What is claimed is:

1. A computer case retention structure, comprising:
    a base having a bottom plate and a guided way disposed at an edge of the bottom plate, wherein a protruding hook is formed on the guide way and has an slid edge inclined with respect to the guided way, and a stopped edge vertical to the guided way;
    a cover having a top plate and at least one side plate, wherein the side plate is extended from one edge of the top plate corresponding to the edge of the bottom plate;
    a first and second elastic blades, wherein one end of the first and the second elastic blades is fixed to the inner surface of the side plate, and at least one protrusion is extended downward from a tip of the other end of the second elastic blade; when the cover is fixed onto the base, the protrusion slides against the guided way, and the protrusion slides along the slid edge of the protruding hook to slide over the protruding hook, and then is stopped by the stopped edge of the protruding hook to prevent the protrusion from moving towards the inverse direction, so that the cover is fixed onto the base without being moved relative to the base; and a release element disposed on the first elastic blade, which is pressed to bend the first elastic blade and the second elastic blade, and the cover can be removed from the base since the protrusion of the second elastic blade is not stopped by the stopped edge of the protruding hook.

2. The computer case retention structure according to claim 1, wherein an opening is disposed on the side plate of the cover, and the release element is located within the opening.

3. The computer case retention structure according to claim 2, wherein the width of the release element is larger than the width of the first elastic blade.

4. The computer case retention structure according to claim 1, wherein a restriction hook is disposed on the inner surface of the side plate, corresponding to one edge of the second elastic blade, for restricting the bending angle of the second elastic blade, and restricting the traveling distance of the release element.

5. The computer case retention structure according to claim 1, wherein the second elastic blade has a hollow area, and the first elastic blade is located within the hollow area.

6. The computer case retention structure according to claim 5, wherein the profile of the second elastic blade is shaped to be V-shaped or U-shaped while the hollow area is rectangular.

7. The computer case retention structure according to claim 1, wherein the first elastic blade is formed with and the second elastic blade monolithically, one end of them are connected to each other and fixed to the inner surface of the side plate, and the other end of the first and the second elastic blades are separated from each other.

8. The computer case retention structure according to claim 1, wherein at least one guide plate is disposed on the inner surface of the side plate and the guide plate is shaped to be V-shaped or U-shaped in cross-section along its longitudinal axis with a extended guided groove formed at the recessed part of the guide plate; and the guided groove is for mating with the guided way slides to guide the cover moving linearly relative to the base.

9. The computer case retention structure according to claim 1, wherein a stopping hook, bending backward far away from the first elastic blade and the second elastic blade, is disposed on the inner surface of the side plate, and a side wing is disposed on the edge of the bottom plate for being hooked by the stopping hook.

10. The computer case retention structure according to claim 9, wherein the side wing having a notch is disposed on one edge of the bottom plate, and a fix pin corresponding to the notch is disposed on the side plate for being inserted into the notch to prevent the cover from being moved relative to the base.

11. The computer case retention structure according to claim 1, wherein the release element is a lump, a button, or a block.

* * * * *